(12) United States Patent
Matthews

(10) Patent No.: US 8,757,856 B2
(45) Date of Patent: Jun. 24, 2014

(54) LIGHT WARNING DEVICE FOR EMERGENCY VEHICLES

(75) Inventor: Patrick Matthews, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 13/290,460

(22) Filed: Nov. 7, 2011

(65) Prior Publication Data

US 2013/0114284 A1    May 9, 2013

(51) Int. Cl.
   *B60Q 1/26* (2006.01)
(52) U.S. Cl.
   USPC ...... 362/542; 362/493; 362/427; 362/249.03; 362/249.07; 362/249.09
(58) Field of Classification Search
   USPC ......... 362/493, 524, 527, 269, 285, 287, 419, 362/427, 428, 322, 540, 496, 542, 508, 233, 362/250, 249.01, 249.03, 249.07, 249.09, 362/249.11
   See application file for complete search history.

(56) References Cited

U.S. PATENT DOCUMENTS

| 4,259,660 | A   | * | 3/1981  | Oliver             | 340/480 |
| 6,484,456 | B1  | * | 11/2002 | Featherstone et al.| 52/118  |
| 7,572,044 | B2  | * | 8/2009  | Nebeker            | 362/542 |
| 2002/0036908 | A1 | * | 3/2002 | Pederson           | 362/545 |
| 2002/0041499 | A1 | * | 4/2002 | Pederson           | 362/545 |
| 2002/0048173 | A1 | * | 4/2002 | Schmucker          | 362/487 |
| 2002/0048174 | A1 | * | 4/2002 | Pederson           | 362/487 |
| 2003/0021121 | A1 | * | 1/2003 | Pederson           | 362/493 |
| 2004/0032745 | A1 | * | 2/2004 | Pederson           | 362/545 |
| 2005/0057941 | A1 | * | 3/2005 | Pederson et al.    | 362/542 |

* cited by examiner

*Primary Examiner* — Anh Mai
*Assistant Examiner* — Kevin Quarterman
(74) *Attorney, Agent, or Firm* — Frank A. MacKenzie; Price Heneveld LLP

(57) ABSTRACT

A vehicular warning device comprises a light bar with at least one light source and a light bar support. The light bar support includes a frame member and a light bar mounting member. The frame member is rigidly mounted to a portion of a vehicle and the light bar mounting member is mounted to the frame member. The light bar is mounted to the light bar mounting member. Illumination from the at least one light source can be shifted between at least a first position and a second position.

20 Claims, 5 Drawing Sheets

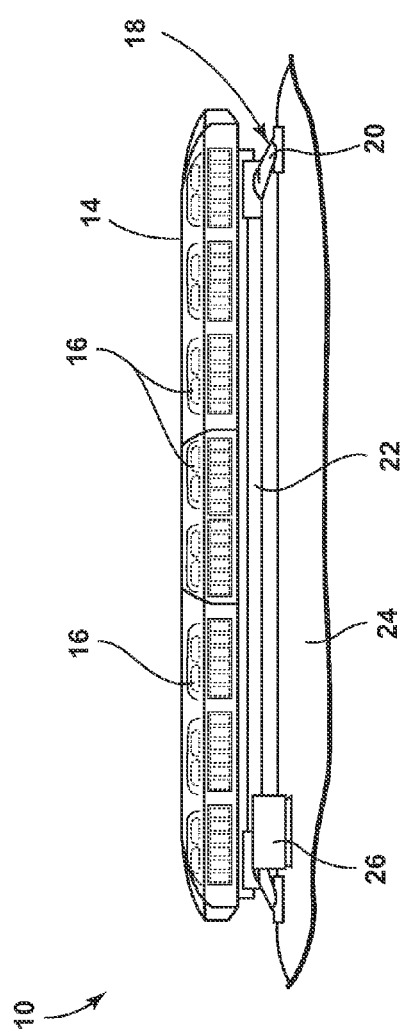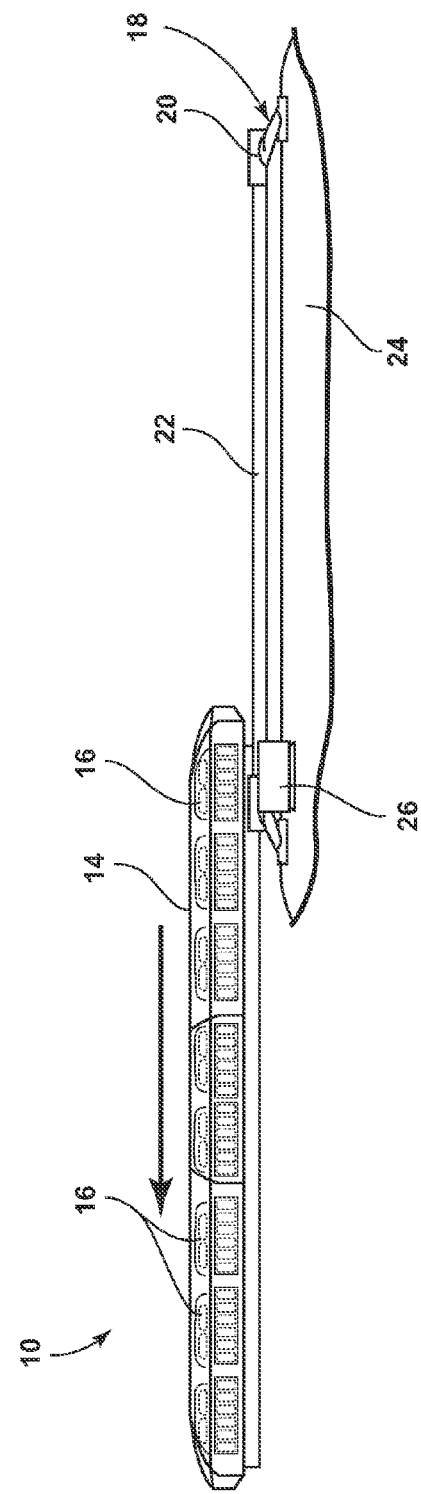

US 8,757,856 B2

LIGHT WARNING DEVICE FOR EMERGENCY VEHICLES

FIELD OF THE INVENTION

The present invention generally relates to emergency vehicle lighting, and more particularly to a warning device for an emergency vehicle that can be moved between different positions.

BACKGROUND OF THE INVENTION

Emergency vehicles, such as police cars and ambulances, often have warning or alert systems mounted on them to warn individuals in the vicinity that the emergency vehicle is approaching, or to alert individuals of a dangerous situation. Typically, these systems include a siren to provide an audible warning, and a lighting system typically centered atop the emergency vehicle to provide a visual flashing light warning.

Often, police officers or emergency medical technicians (EMTs) work dangerously close to active vehicle traffic lanes. The situation is made even more dangerous by the unconscious tendency of drivers to steer or drift toward the object at which they are looking. Especially when it is dark, the most noticeable distraction may be the emergency lights atop the respondent's emergency vehicle.

SUMMARY OF THE INVENTION

One aspect of the present invention includes a vehicular warning device which comprises a light bar with at least one light source and a light bar support. The light bar support includes a frame member and a light bar mounting member. The frame member is rigidly mounted to a portion of a vehicle and the light bar mounting member is mounted to the frame member. The light bar is mounted to the light bar mounting member. Illumination from the at least one light source can be shifted between at least a first position and a second position.

Another aspect of the present invention includes a vehicular warning device which comprises a light bar with at least one light source and a light bar support. The light bar support includes a frame member and a light bar mounting member. The frame member is rigidly mounted to a portion of a vehicle and the light bar mounting member is movably mounted to the frame member. The light bar is mounted to the light bar mounting member and is movable between a first position and a second position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a front detail view of the light warning device of FIG. 1, illustrating a non-deployed, centered position;

FIG. 3 is a front detail view of the light warning device of FIG. 1, illustrating a deployed position;

DETAILED DESCRIPTION OF THE PREFERRED EMBODIMENTS

Figure 1:
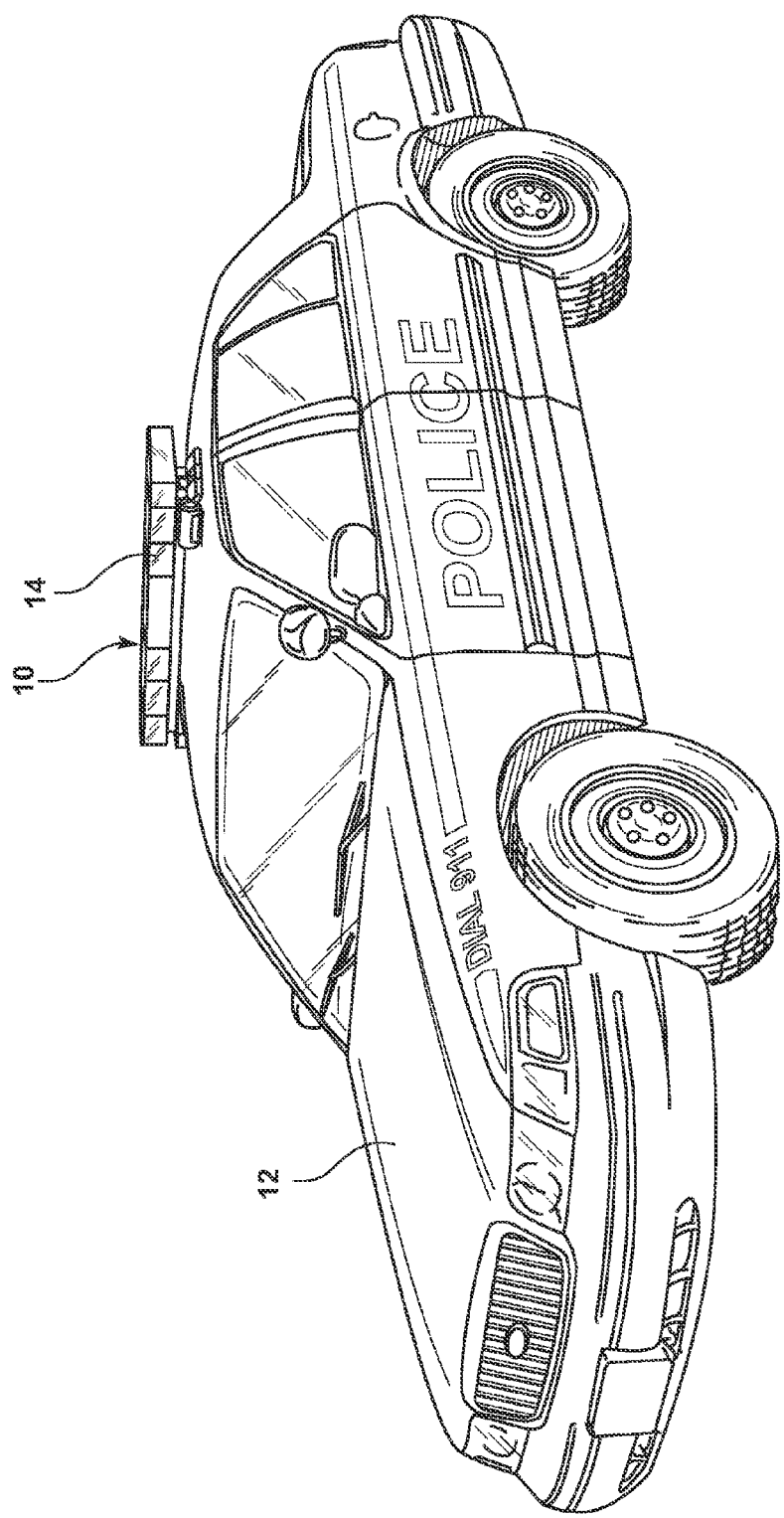
FIG. 1 is a front perspective view of an emergency vehicle equipped with a light a warning device according to the present invention.

For purposes of description herein, the terms "upper," "lower," "right," "left," "rear," "front," "vertical," "horizontal," "interior," "exterior," and derivatives thereof shall relate to the invention as oriented in FIG. 1 and from a seated driver's point of view. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-3, reference numeral 10 generally designates one embodiment of a light warning device for a vehicle 12, particularly for an emergency vehicle such as a police vehicle, ambulance, first truck, and other such vehicles. The light warning device 10 comprises a light bar 14 with at least one light source, each referred to herein as a bulb 16, and a light bar support 18. The light bar support 18 comprises a frame member 20 that is rigidly mounted to a portion of a vehicle 12, and a light bar mounting member 22 mounted to the frame member 20 for mounting the light bar 14 thereto. Illumination from the light bulb(s) 16 can be shifted between at least a first position, such as a centered position, and a second position, such as a non-centered position.

The light bar 14 typically flashes the light output by the light bulb(s) 16 to convey to others the urgency of the vehicle's passage, to provide a warning of a potentially hazardous situation, or to signal a driver to pull their vehicle over. The flashing light may be realized by turning the light source(s) on and off, moving a shield, reflector, or lens in relation to each light source, or other known means. The light warning device 10, as illustrated, includes the light bar 14, however, it should be understood that the light warning device 10 could include one or more beacons, either in addition to or instead of the light bar 14. The light source(s) may each include an incandescent bulb, halogen bulb, light emitting diode (LED), or other known light source.

In a first embodiment of the invention, the light bar 14 is approximately centered across the width of the vehicle 12 (in the cross-car direction, perpendicular to the longitudinal direction of the vehicle 12) and is mounted to a roof 24 of the vehicle 12 by the frame member 20. The frame member 20 is an elongated rail-type structure that is mechanically secured, by fasteners, welds, or any other suitable means, to the roof 24 in a fixed position. The light bar mounting member 22 is slidably mounted to the frame member 20, and the light bar 14 is secured to the light bar mounting member 22. The light bar mounting member 22 is movable along the frame member 20 through linear slides, such as ball bearing slides, roller slides, or any other suitable means of providing linear motion to move the light bar 14 laterally among left, right and centered positions.

According to one embodiment, the light warning device 10 may include a motor 26 secured to either the roof 24 or the light bar support 18. The motor 26 is operably connected to the slidable light bar mounting member 22 in any suitable fashion as understood by one having ordinary skill in the art. The motor 26 may actuate the light bar 14 in response to a user input, such as a switch. According to another embodiment, the light bar 14 may be actuated manually by a user.

The light warning device 10 can be shifted from a first position, shown in FIG. 2, to a second position, shown in FIG. 3. In the first position, the light bar 14 is approximately centered across the width of the roof 24, and in the deployed second position, the light bar 14 is shifted along the frame member 20, such that the light bar 14 is no longer centered on the roof 24. In the second position, the light bar 14 can extend beyond the perimeter of the roof 24. Simply put, the light bar 14 can stick out from the edge of the roof 24. Further, the light bar 14 can be deployed from the first to the second position manually or by activating the motor 26. The motor 26 is operably connected to the light bar mounting member 22 such that when the motor 26 is activated, the light bar mounting member 22 slides along the frame member 20. Additionally, the light bar 14 can be shifted in either left-side or right-side directions from center. Though shown shifted to the left side, it should be understood by one having ordinary skill in the art that the light bar 14 can also be shifted to the right side.

The light warning device 10 can increase roadside safety when installed and used on an emergency vehicle 12, such as a police car. For example, when a police officer pulls a driver over for speeding, or some other traffic violation, the offending vehicle and the police car typically pull over to the side of the road. Depending on the surrounding area, the vehicles may not be able to pull completely off the road and out of the active lane of traffic. However, even if they are able to pull completely off the road, the police officer and the driver are still in a potentially perilous position. The unconscious tendency of passing drivers of other vehicles may be to steer or drift toward the object(s) at which they are looking; in this case, the flashing and illuminated light bar 14, the parked police car, and the offending vehicle. Sometimes this tendency can even lead to the passing driver crashing into one of the stopped vehicles, or even worse, into the police officer who is standing outside the vehicles.

Given this potentially dangerous situation, the light warning device 10 can shift the flashing and illuminated light bar 14 toward the active traffic lane, thereby moving passing drivers' focus away from the center of the vehicle 12. Shifting the passing driver's focus adds space between the passing vehicle and the stopped vehicles, which decreases the probability that a passing driver will crash into one of the stopped vehicles.

As described above, the light bar 14 is able to shift in either direction, so regardless of which side of the road the police officer pulls the offending vehicle over, the light bar 14 can be shifted toward the active traffic lane. Specifically, if the police officer pulls the offender over on the right-hand side of the road, the light bar 14 can be shifted to the left, toward the active traffic lane. The opposite is true if the police office pulls the offender over on the left-hand side of the road.

Figure 4:
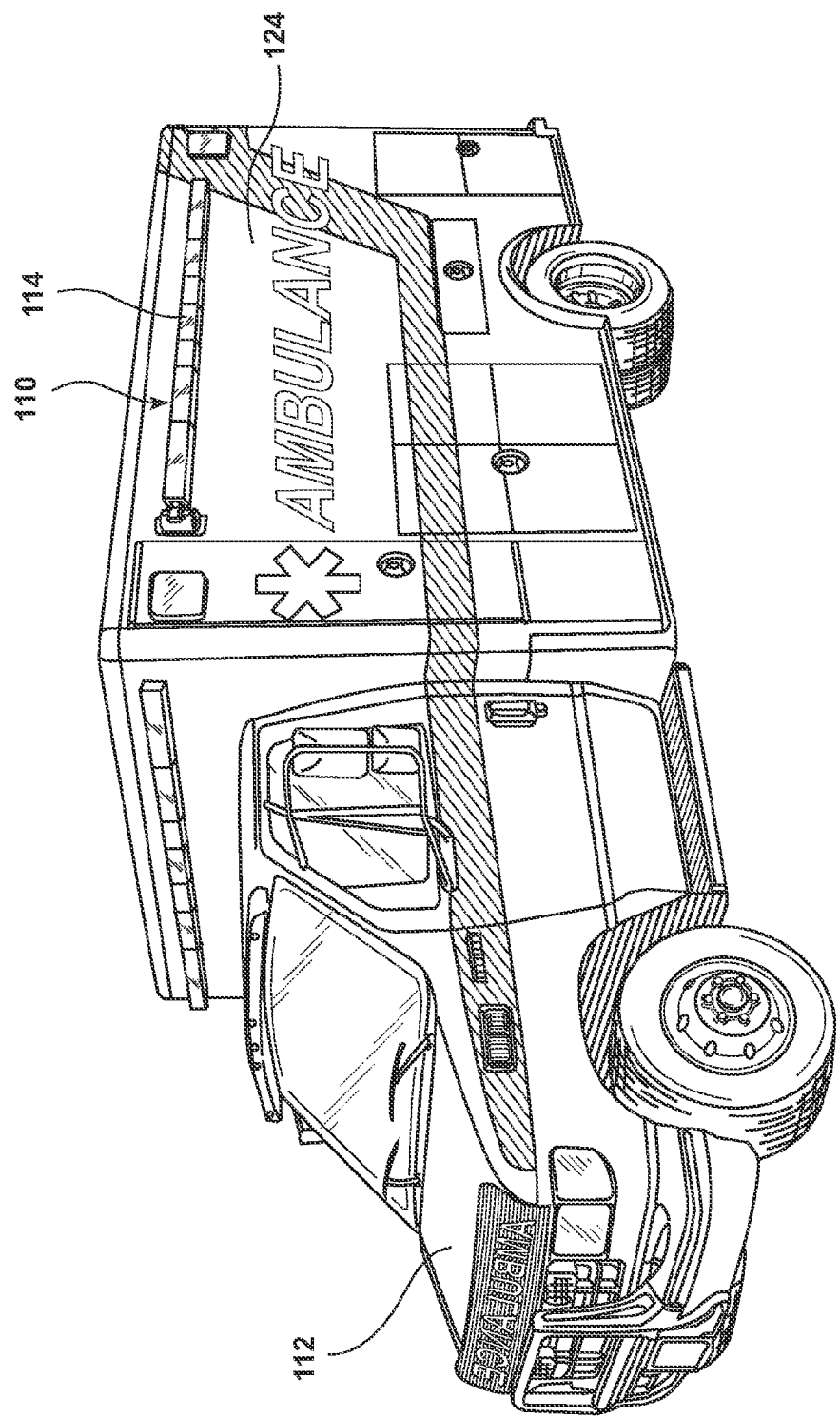
FIG. 4 is a front perspective view of an emergency vehicle equipped with a light warning device according to a second embodiment of the present invention.
Figure 5:
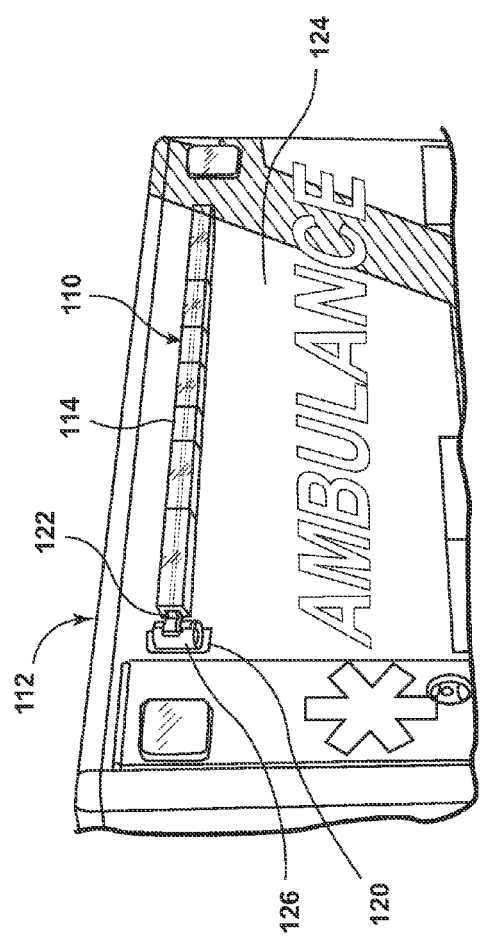
FIG. 5 is a side detail view of the light warning device of FIG. 4, illustrating a non-deployed position.
Figure 6:
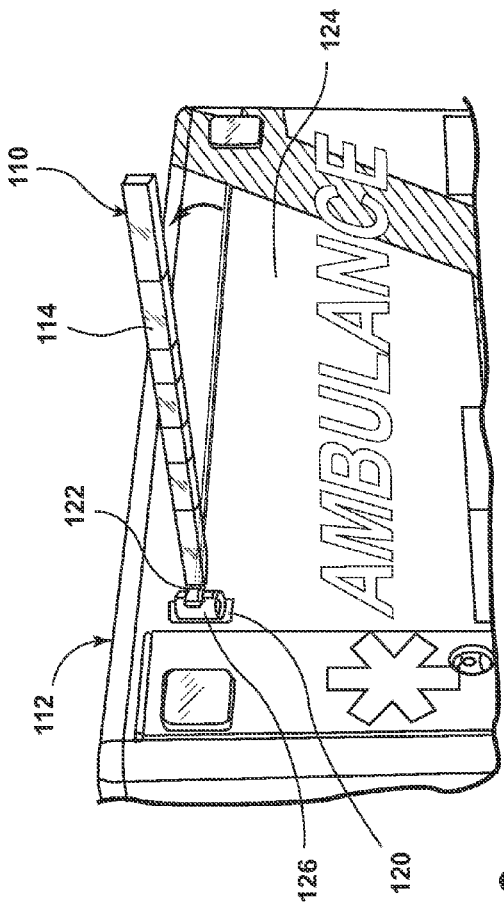
FIG. 6 is a front detail view of the light warning device of FIG. 4, illustrating a deployed position.

Referring to FIGS. 4-6, a second embodiment of a light warning device 110 is illustrated, where elements from the first embodiment are labeled with the same reference numerals increased by 100. The light warning device 110 comprises the light bar 114, frame member 120, and light bar mounting member 122. In this embodiment, the light warning device 110 is mounted to a side 124 of the vehicle 112 by the frame member 120, which is mechanically secured, by any suitable means, to the side 124 in a fixed position. The light bar mounting member 122 is pivotally mounted to the frame member 120 by fasteners, welds, or any other suitable means, and the light bar 114 is secured to the light bar mounting member 122. Further, the light warning device 110 may include the motor 126, which can be secured to either the side 124 of the vehicle 112 or to the frame member 120. The motor 126 is operably connected to the pivotable light bar mounting member 122 in any suitable fashion as understood by one having ordinary skill in the art. The motor 126 may activate the pivotable light bar mounting member 122 in response to a user input, such as a switch.

The light warning device 110 can be mounted on the side 124 of an emergency vehicle 112, such as an ambulance, and can be shifted from a first position, shown in FIG. 5, to a second position, shown in FIG. 6. In the first position, the light bar 114 is juxtaposed the side 124 of the vehicle 112, and in the deployed second position, the light bar 114 is pivoted away from the side 124 of the vehicle 112, approximately 90°, such that the light bar 114 extends out from the side 124 of the vehicle 112. Additionally, the light bar 114 can be deployed from the first position to the second position manually or by activating the motor 126. The motor 126 is operably connected to the light bar mounting member 122 such that when the motor 126 is activated, the light bar mounting member 122 pivots relative to the frame member 120. Additionally, the light warning device 110 can be mounted on either or both sides 124 of the vehicle 112. Though shown with the light bar 114 mounted on the left side 124 of the vehicle, it should be understood by one having ordinary skill in the art that the light warning device 110 can also be mounted on the right side 124 of the vehicle 112.

Figure 7:
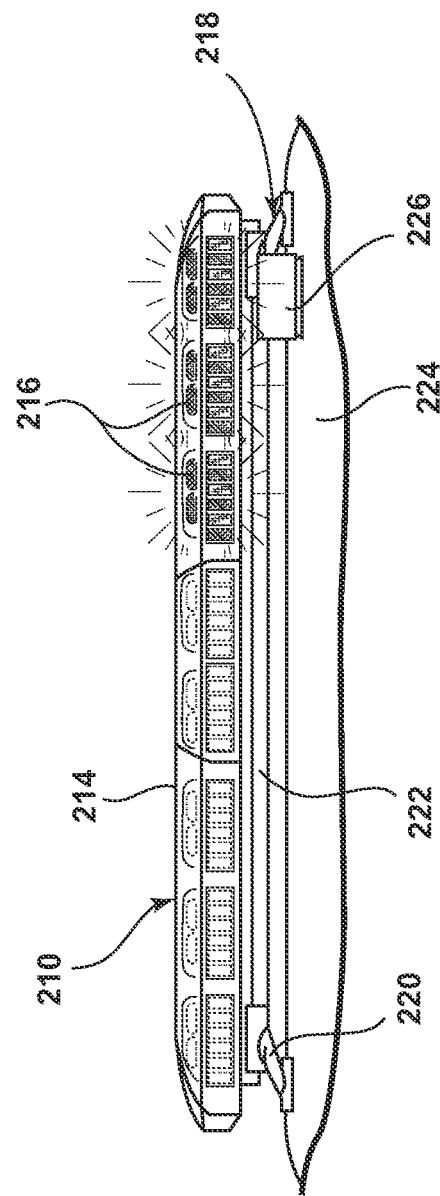
FIG. 7 is a front detail view of the light warning device according to a third embodiment of the present invention.

Referring to FIG. 7, a third embodiment of a light warning device 210 is illustrated, where elements from the first embodiment are labeled with the same reference numerals increased by 200. The light warning device 210 comprises the light bar 214, frame member 220, and light bar mounting member 222. Like the light warning device 10 of the first embodiment, light warning device 210 is mounted on the roof 224 of the vehicle 212. However, the light bar 214 may or may not be slidably mounted to the frame member 220. Also, the light bar 214 includes a plurality of light sources, for example light bulbs 216 to provide a warning light. The bulbs 216 are spaced over the length of the light bar 214, and power to the light bulbs 216 can be provided by the vehicle's 212 electrical system (not shown), or by an independent source. Further, the light bulbs 216 can be activated by a controller (not shown) and/or in response to a user input.

In operation, illumination from the light bulbs 216 can be shifted such that less than the entire length of the light bar 214 is illuminated. In other words, only a left or right portion of the light bar 214 can be illuminated, as opposed to the entire light bar 214. As shown in FIG. 7, the right portion of the light bar 214 is illuminated by turning on only the right side light bulbs 216, and the left portion is not. Though shown with the right portion of the light bar 214 illuminated, it should be understood by one having ordinary skill in the art that the left portion of the light bar 14 could be illuminated, and the right portion not illuminated.

As described above relative to the first embodiment, the light warning device 210 can shift the flashing and illuminated portion of the light bar 214 toward the active traffic lane, thereby moving the passing drivers' focus away from the center of the vehicle 212. Further, either portion of the light bar 214 is able to be illuminated or not, so regardless of which side of the road the emergency personnel (e.g., police officer) pulls over, illumination of the light bar 214 can be shifted toward the active traffic lane.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicular warning device comprising:
a light bar having a light source;
a support assembly comprising:
a frame member rigidly mounted to a roof of a vehicle;
a mounting member supporting the light bar and movably mounted to the frame member;
wherein the light bar is laterally movable relative to the frame member between a first position within or adjacent to a perimeter of the vehicle and a second position laterally beyond the perimeter.

2. The vehicular warning device of claim 1, wherein the mounting member slides laterally relative to the frame member between the first and second positions.

3. The vehicular warning device of claim 2, wherein the mounting member slides linearly relative to the frame member between the first and second positions.

4. The vehicular warning device of claim 3, wherein the light bar is approximately centered across a width of the roof in the first position.

5. The vehicular warning device of claim 3, wherein the light bar is not centered on the roof and extends beyond the perimeter of the vehicle in the second position.

6. The vehicular warning device of claim 5, wherein the light bar is manually shifted to the second position.

7. The vehicular warning device of claim 5, further comprising a motor coupled to the light bar, wherein the light bar is shifted to the second position by the motor.

8. The vehicular warning device of claim 1, wherein the light bar includes at least one light source configured to flash light.

9. The vehicular warning device of claim 1, wherein the mounting member is pivotally mounted to the frame member.

10. The vehicular warning device of claim 9, wherein the light bar includes an elongated member having a plurality of the light sources spaced along a length of the elongated member.

11. The vehicular warning device of claim 9, wherein the light bar is pivoted laterally away from the side of the vehicle in the second position, such that the light bar extends out from the side of the vehicle.

12. The vehicular warning device of claim 1, wherein illumination from the light source is shifted such that less than the entire light bar is illuminated.

13. The vehicular warning device of claim 12, wherein a first side portion of the light bar is illuminated, and an opposite second side portion of the light bar is not illuminated.

14. A vehicular warning device comprising:
a light having an elongated member with light sources spaced therealong;
a light support comprising:
a frame member rigidly mounted to a vehicle;
a light mounting member supporting the light and movably mounted to the frame member;
wherein the light mounting member moves the light laterally relative to the frame member between a first position adjacent to the vehicle and a second position laterally away from the vehicle.

15. The vehicular warning device of claim 14, wherein the light mounting member is slidably mounted to the frame member.

16. The vehicular warning device of claim 15, wherein the frame member is mounted to a roof of the vehicle.

17. The vehicular warning device of claim 16, wherein the light is approximately centered laterally across a width of the roof in the first position, and the light is shifted along the frame member in the second position, such that the light is not centered on the roof and extends beyond a lateral perimeter of the vehicle.

18. The vehicular warning device of claim 14, wherein the frame member is mounted to a side of the vehicle and the light mounting member is pivotally mounted to the frame member.

19. The vehicular warning device of claim 18, wherein the light is juxtaposed the side of the vehicle in the first position, and wherein at least one of the light sources is configured to flash for providing a warning.

20. The vehicular warning device of claim 18, wherein the light is pivoted away from the side of the vehicle, approximately ninety degrees, in the second position, such that the light extends out from the side of the vehicle.

* * * * *